United States Patent [19]

Shen

[11] 4,356,565
[45] Oct. 26, 1982

[54] LASER BEAM TUBE WITH HELICAL GAS FLOW FOR REDUCING THERMAL BLOOMING IN THE LASER BEAM

[75] Inventor: Peter I. Shen, San Pedro, Calif.

[73] Assignee: Hughes Aircraft Company, Culver City, Calif.

[21] Appl. No.: 97,286

[22] Filed: Nov. 26, 1979

[51] Int. Cl.³ .............................................. H01S 3/03
[52] U.S. Cl. .................................................. 372/61
[58] Field of Search ............... 331/94.5 G, 94.5 PE, 331/94.5 P, 94.5 C, 94.5 D; 313/182, 185

[56] References Cited

U.S. PATENT DOCUMENTS 3,449,615 6/1969 Tucker et al. ...................... 313/226

OTHER PUBLICATIONS

"Performance Study of a Vortex-Stabilized Arc Radiation Source" by Anderson et al.; *Appl. Optics*, vol. 4, No. 11, Nov. 1965, p. 1435.

"Vortex Discharge as a Pumping Source for Continuous Wave Lasers", Zhitkova et al., *Soc. Jour. Quant. Elect.*, vol. 1, No. 3, Nov-Dec. 1971.

"Vortex Stabilized Flashlamps for Dye Laser Pumping" by M. E. Mack, *Appl. Optics*, vol. 13, No. 1, Jan. 1974.

*Primary Examiner*—William L. Sikes
*Assistant Examiner*—Leon J. Scott
*Attorney, Agent, or Firm*—Paul M. Coble; Leonard A. Alkov; W. H. MacAllister

[57] ABSTRACT

A laser beam flow tube arrangement is disclosed in which the Ranque-Hilsch effect is advantageously utilized to reduce thermal blooming in a laser beam. The arrangement includes a tubular member through which the laser beam is propagated longitudinally and a vortical flow generator in gas flow communication with the interior of the tubular member. The flow generator produces vortical flow of a gas having low absorption properties at the wavelength of the laser beam and introduces the vortically flowing gas into the tubular member. The gas flows along a helical path within the tubular member with a tangential velocity selected to provide a negative temperature gradient between the wall and axis of the tubular member which is substantially equal in magnitude to the positive temperature gradient therebetween due to the thermal blooming.

6 Claims, 4 Drawing Figures

LASER BEAM TUBE WITH HELICAL GAS FLOW FOR REDUCING THERMAL BLOOMING IN THE LASER BEAM

BACKGROUND OF THE INVENTION

1. Field of the Invention

This invention relates to lasers, and more particularly it relates to laser beam flow tubes to reduce thermal blooming in laser beams.

2. Description of the Prior Art

When a laser beam propagates through a gas, the gas becomes heated due to the absorption of laser energy. This gives rise to gas density variations which, in turn, result in spatial variations in the index of refraction of the gas. Over sufficiently long beam paths, the shape of the beam can change due to light being refracted toward regions of higher density. An expansion of the beam and a decrease in beam intensity result. The foregoing and related phenomena that tend to degrade a laser beam are usually referred to as "thermal blooming", which is discussed in detail in the paper by D. C. Smith, "High-Power Laser Propagation: Thermal Blooming", *Proceedings of the IEEE*, Vol. 65, 1977, pages 1679-1714.

In certain laser applications it is necessary for a laser beam to travel to a telescope at a location spaced from the laser generator. In order to reduce thermal blooming of the laser beam as it propagates to the telescope, a flow tube has been disposed about the laser beam path, with a gas having low absorption properties at the laser beam wavelength being propagated either axially along the tube or transversely across the tube. For further details concerning laser beam flow tubes with axial or transverse gas flow, reference may be made to the papers "Control of Propagation-Path Environment Between a High-Power Laser and Output Port to Reduce Wave-Front Distortions", by S. Y. Shey, J. Herrmann, and T. Stephens, Massachusetts Institute of Technology Lincoln Laboratory Project Report LTP-19 (May 21, 1973), pages 1-15; "Thermal Effects in Laser Beam Propagation Through Flow Tubes", by R. E. Kelly, P. I. Shen, and G. C. Valley, Paper No. 79-HT-94 presented at the Joint ASME/AICHE 18th National Heat Transfer Conference, San Diego, CA., Aug.6-8, 1979; and "Thermal Blooming in Axial Pipe Flow", by George C. Valley, Peter I-Wu Shen, and Robert E. Kelly, *Applied Optics*, Vol. 18, No. 16 (Aug. 15, 1979) pages 2728-2730.

Although the aforementioned laser beam flow tubes with axial or transverse gas flow are able to reduce thermal blooming, nevertheless, these types of flow can introduce higher order optical distortion into the laser beam. More specifically, the transverse flow tends to introduce tilt error, while the axial flow tends to introduce focus error. Heretofore, complex and expensive adaptive optics was needed to correct errors of this nature. Moreover, the quantity of gas required in axial or transverse flow arrangements may be excessive for some applications.

SUMMARY OF THE INVENTION

It is an object of the present invention to provide a laser beam flow tube for reducing thermal blooming in a laser beam and at the same time eliminating the need for adaptive optics correction of tilt and focus distortion of the beam.

It is a further object of the present invention to provide a laser beam flow tube in which the flow of a gas having low absorption properties at the laser beam wavelength is employed to reduce thermal blooming in a laser beam, and which consumes substantially less gas than otherwise comparable laser beam flow tubes of the prior art.

In accordance with the invention a vortical flow generator is operatively associated with a tubular member through which a laser beam is propagated. The flow generator produces vortical flow of a gas having low absorption properties at the wavelength of the laser beam and introduces the vortically flowing gas into the tubular member. This introduced gas flows along a helical path within the tubular member with a tangential velocity selected to reduce the temperature gradient between the tubular member and its axis due to thermal blooming in the laser beam.

Additional objects, advantages, and characteristic features of the present invention will become readily apparent from the following detailed description of a preferred embodiment of the invention when considered in conjunction with the accopanying drawings.

BRIEF DESCRIPTION OF THE DRAWINGS

In the accompanying drawings.

DETAILED DESCRIPTION OF THE INVENTION

Figure 2:
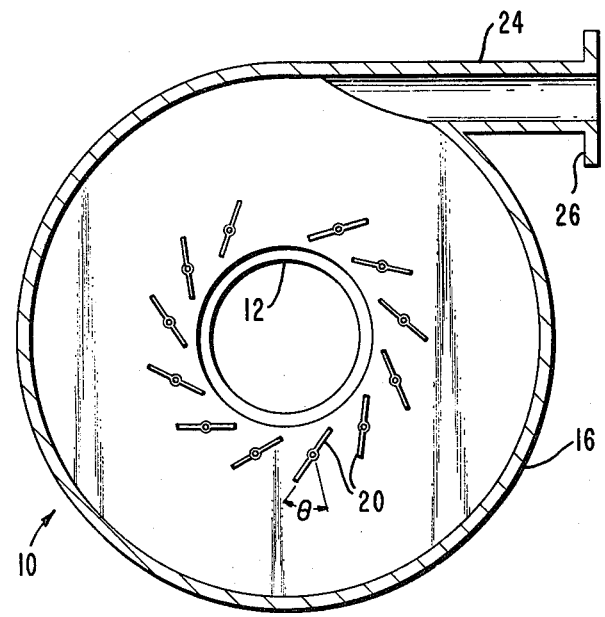
FIG. 2 is a cross-sectional view taken along line 2—2 of FIG. 1.
Figure 1:
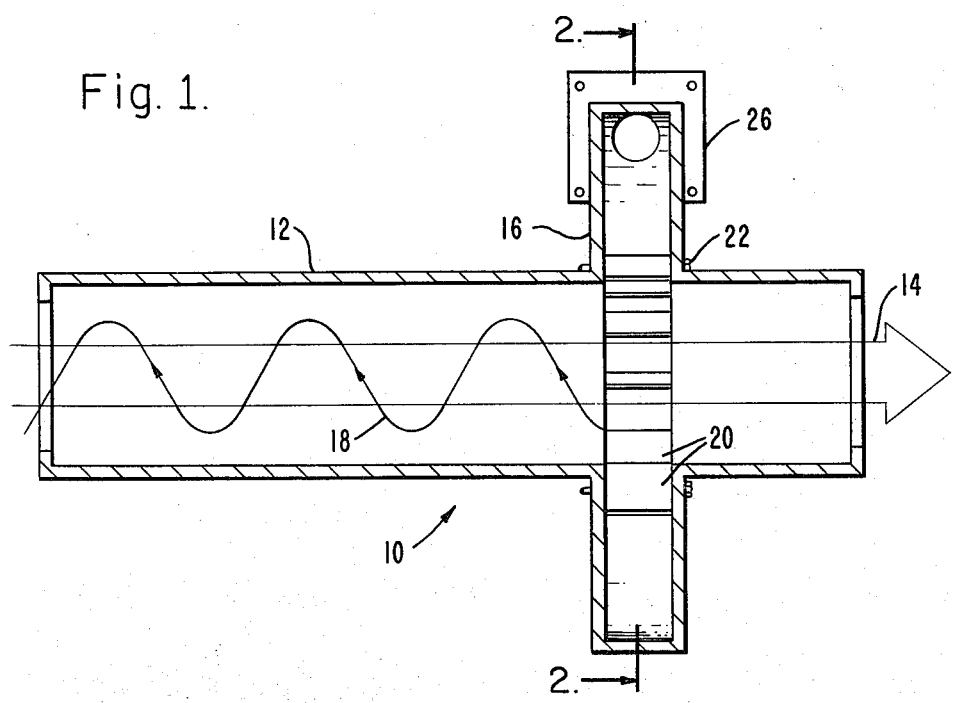
FIG. 1 is longitudinal sectional view illustrating a laser beam flow tube arrangement in accordance with the invention.

Referring to FIGS. 1 and 2 with greater particularly, there is shown a laser beam flow tube arrangement 10 including a tubular member 12 through which a laser beam 14 is propagated longitudinally to reduce thermal blooming in the beam 14. The tubular member 12 may be of a metal such as aluminum, although it should be understood that other materials are also suitable and may be employed instead. Moreover, while only a single flow tube arrangement 10 is shown in FIG. 1, several flow tube arrangements 10 may be disposed in series when the distance over which it is desired to reduce thermal blooming of the laser beam 14 is sufficiently large.

Coaxially disposed about the tubular member 12 near one of its ends is an annular vortex chamber 16. A cylindrically-shaped opening is provided through the tubular member 12 adjacent to the radially inner extremity of the vortex chamber 16 to permit gas flow from the chamber 16 into the interior of the tubular member 12. The vortex chamber 16 functions to produce a vortical, or swirling, flow in a gas having low absorption properties at the wavelength of the laser beam 14 and to introduce the vortically flowing gas into the tubular member 12 such that it flows through the tubular member 12 along a helical path 18. As will be explained more fully below, this gas flow creates a temperature gradient between the tubular member 12 and its axis which compensates for the temperature gradient that otherwise would result due to thermal blooming in the beam 14, thereby reducing the thermal blooming.

In the exemplary vortex chamber 16 illustrated in FIGS. 1 and 2, the vortical gas flow is generated by means of a series of planar vanes 20 mounted in the chamber 16 on respective axes which are equally circumferentially spaced along a cylindrical locus slightly radially outwardly of the cylindrical opening between the chamber 16 and the tube 12. The vanes 20 are disposed in respective planes parallel to the axis of the tube 12 and offset from respective radial directions between the axis of the vane in question and the axis of tube 12 by an angle $\theta$. The vanes 20 may be mounted on screws or bolts 22 through opposing side walls of the chamber 16 and extending along the respective vane axes. The angular orientation $\theta$ of the vanes 20 may be adjusted by means of the screws 22 to vary the swirl number (ratio of the angular momentum to the axial momentum of the vortical gas flow) so as to maximize the thermal blooming compensation.

In order to introduce the desired gas into the vortex chamber 16, an input tube 24 is provided in gas flow communication with a circumferential portion of the chamber 16. The outer end of the tube 24 may be provided with a mounting flange 26 for attachment to a suitable gas source (not shown). Examples of suitable gases which may be employed are nitrogen, argon, and helium, although it should be understood that other gases are also suitable and may be employed instead.

The operation of a laser beam flow tube arrangement according to the invention will now be explained. It is known that when a vortical gas flow is created in a tube, a temperature gradient results in which the axial region to the tube is cooler than the circumferential region (which is hereinafter referred to as a "negative" temperature gradient). This phenomenon is commonly known as the Ranque-Hilsch effect and in the past has been studied extensively, both analytically and experimentally. For a detailed discussion of the Ranque-Hilsch effect reference may be made to the paper by R. G. Deissler and M. Perlmutter, "Analysis or the Flow and Energy Separation in a Turbulent Vortex", *International Journal of Heat and Mass Transfer*, Vol. 1 (1960), Pergamon Press, pages 173-191.

In a laser beam flow tube arrangement according to the invention, the Ranque-Hilsch effect is advantageously utilized to reduce thermal blooming in a laser beam. More specifically, gas from the vortex chamber 16 is caused to flow through the tube 12 along helical path 18 about the laser beam 14 with a tangential velocity selected to reduce the temperature gradient between the wall and axis of the tube 12 due to thermal blooming. Preferably, the tangential velocity is such as to provide a negative temperature gradient between the wall and axis of the tube 10 which is substantially equal in magnitude to the positive temperature gradient therebetween due to the thermal blooming.

Figure 3:
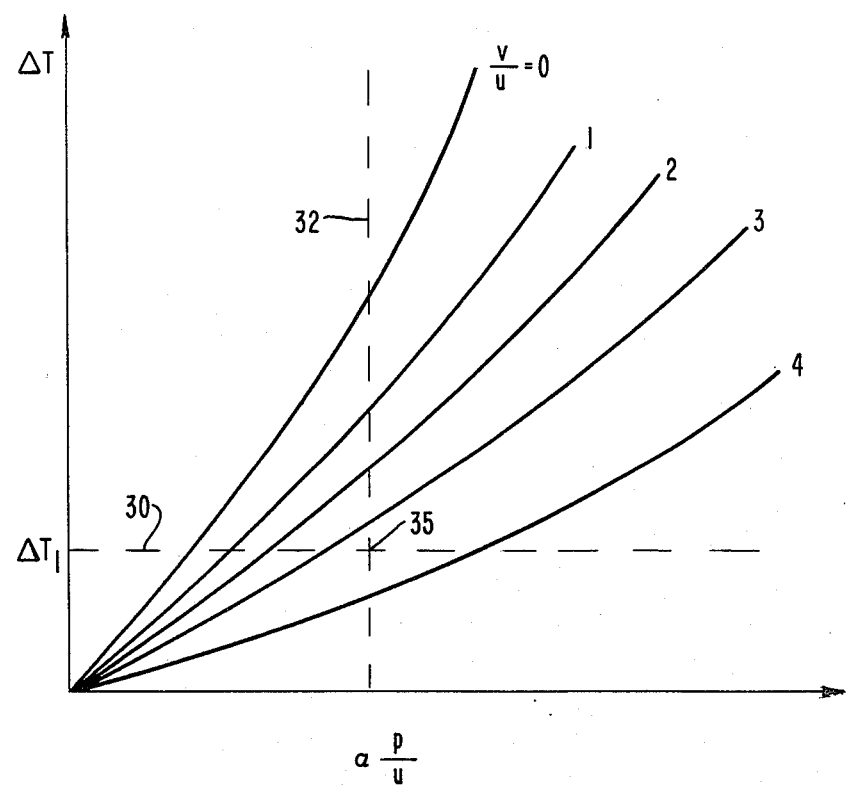
FIGS. 3 and 4 are graphs used in explaining the present invention.

In FIG. 3 the positive temperature gradient $\Delta T$ between the wall and axis of the tube 12 due to thermal blooming in the beam 14 is plotted as a function of an axial flow thermal blooming parameter $\alpha P/u$, where P is the power of the laser beam 14, u is the axial velocity of the flowing gas, and $\alpha$ is the light absorption coefficient of the gas for various ratios of the tangential velocity v to the axial velocity u of the gas. In designing a laser beam flow tube arrangement according to the invention, a predetermined thermal blooming temperature gradient $\Delta T_1$ is initially assumed, as represented by dashed line 30 in FIG. 3. For a given laser beam power P and gas absorption coefficient $\alpha$ an axial gas flow velocity u is selected so that the axial flow thermal blooming parameter may be represented by dashed line 32 in FIG. 3. The appropriate ratio of the tangential velocity v to the axial velocity u of the helically flowing gas in which the tangential velocity v creates a compensating negative temperature gradient $-\Delta T_1$ indicated in FIG. 3 by point 35 where the lines 30 and 32 intersect. It may be seen that for a higher laser beam power or gas absorption coefficient a higher tangential-to-axial gas velocity ratio is required to compensate for the thermal blooming.

Figure 4:
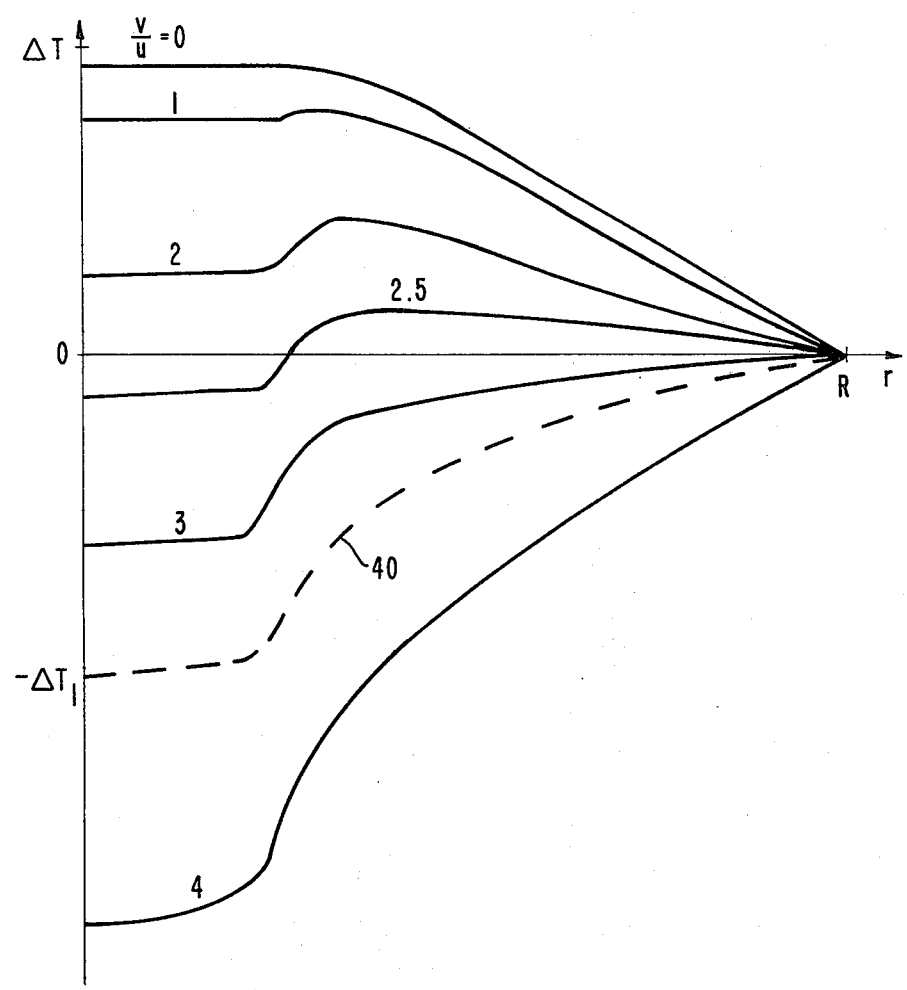

In FIG. 4 the temperature gradient $\Delta T$ within the tube 12 and measured with respect to the tube wall is plotted as a function of radial distance r from the axis of the tube 12 for various ratios of the tangential velocity v to the axial velocity u of the flowing gas. Dashed curve 40 in FIG. 4 illustrates the temperature gradient corresponding to intersection point 35 (v/u is approximately equal to 3.4) in FIG. 3. It may be seen from curve 40 that for the selected velocity raito v/u the temperature gradient $\Delta T$ within the tube 12 varies from zero at the tube wall (r=R) to a value $-\Delta T_1$ at the tube axis, thereby substantially cancelling the thermal blooming temperature gradient $\Delta T_1$.

In a specific exemplary laser beam flow tube arrangement according to the invention which has been constructed, tube 12 had a length of 6 m and a diameter of 5 cm, and vortex chamber vanes 20 were set at an orientation angle $\theta = 60°$. Nitrogen gas ($\alpha = 1.75 \times 10^{-3}$ cm$^{-1}$) was employed as the flowing gas with an axial flow velocity u = 10 m/sec. A laser beam 14 generated by a CO$_2$ laser and having a diameter of 1.9 cm and a power P = 250 watts was propagated through the tube 12. Using the foregoing constructed arrangement, thermal blooming was found to have been reduced considerably from that which occurred without introducing vortical gas flow into the tube 12.

Not only is the present invention able to reduce thermal blooming in a laser beam, but it does so without any need for adaptive optics to correct tilt and focus distortion of the beam. Moreover, with a flow tube arrangement according to the invention, substantially less gas is consumed than for otherwise comparable laser beam flow tubes of the prior art.

Although the present invention has been shown and described with reference to a particular embodiment, nevertheless, various changes and modifications which are obvious to a person skilled in the art to which the invention pertains are deemed to lie within spirit, scope, and contemplation of the invention.

What is claimed is:

1. An arrangement for reducing thermal blooming in a laser beam comprising:
   a tubular member;
   means for causing a laser beam which is subject to thermal blooming to propagate longitudinally through said tubular member; and
   means operatively associated with said tubular member for producing vortical flow of a gas having low absorption properties at the wavelength of said laser beam and for introducing the vortically flowing gas into said tubular member such that said gas is caused to flow along a helical path within said tubular member with a ratio of the tangential velocity to the axial velocity of the vortically flowing gas such that a temperature gradient of an offsetting nature to the temperature gradient due to said thermal blooming of said beam is produced.

2. An arrangement according to claim 1 wherein said tangential velocity is such as to provide a negative temperature gradient between said tubular member and the axis thereof which is substantially equal in magnitude to the positive temperature gradient between said tubular member and said axis due to said thermal blooming.

3. An arrangement according to claim 1 wherein the last named means includes an annular chamber coaxially disposed about said tubular member in gas flow communication with the interior of said tubular member, means for supplying said gas to said chamber, and a plurality of vanes mounted in said chamber and oriented to direct said gas into said tubular member in said vortical flow.

4. An arrangement according to claim 3 wherein said tubular member defines a cylindrically-shaped opening adjacent to the radially inner extremity of said chamber of providing gas flow communication between said chamber and the interior of said tubular member, and said vanes are disposed along a cylindrical locus slightly radially outwardly of said opening.

5. An arrangement according to claim 4 wherein said vanes are respective planar elements mounted on respective axes along said cylindrical locus and in respective planes parallel to the axis of said tubular member, each said vane being offset from the radial direction between its axis and said axis of the said tubular member by a predetermined angle.

6. An arrangement according to any of claims 1, 2, 3, 4, or 5 wherein said gas is selected from the group consisting of nitrogen, argon, and helium.

* * * * *